Nov. 28, 1950     R. E. FULTON, JR     2,532,159
ROADABLE AIRPLANE
Filed March 3, 1945     5 Sheets-Sheet 1
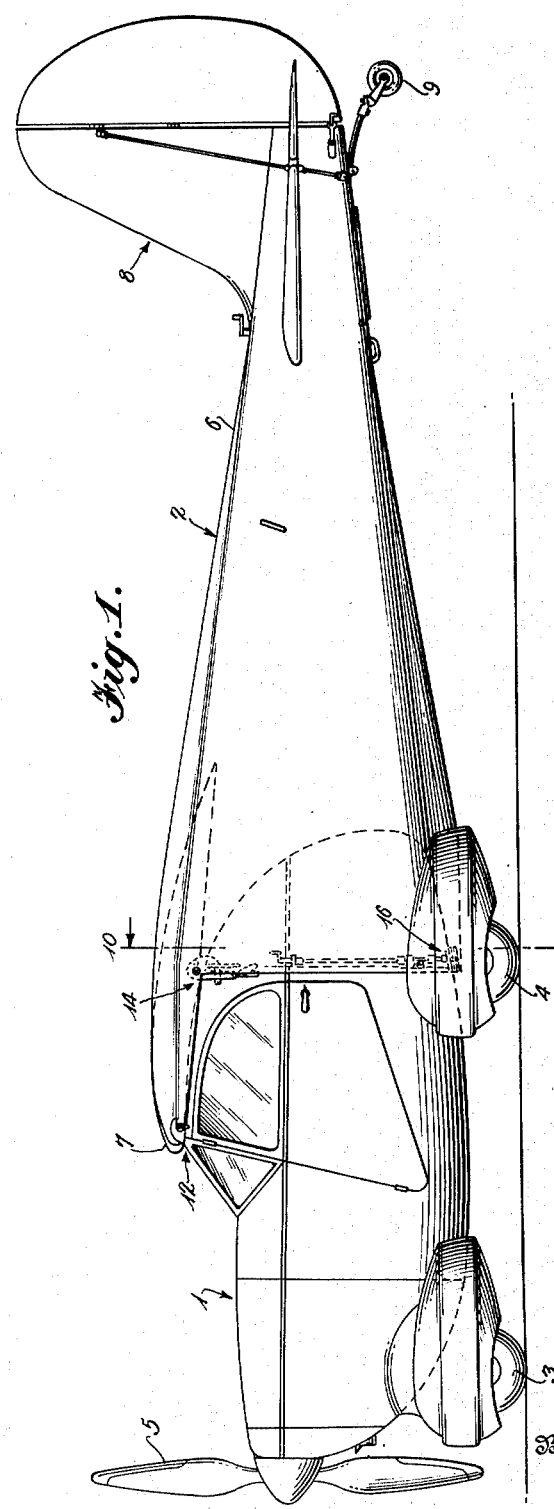
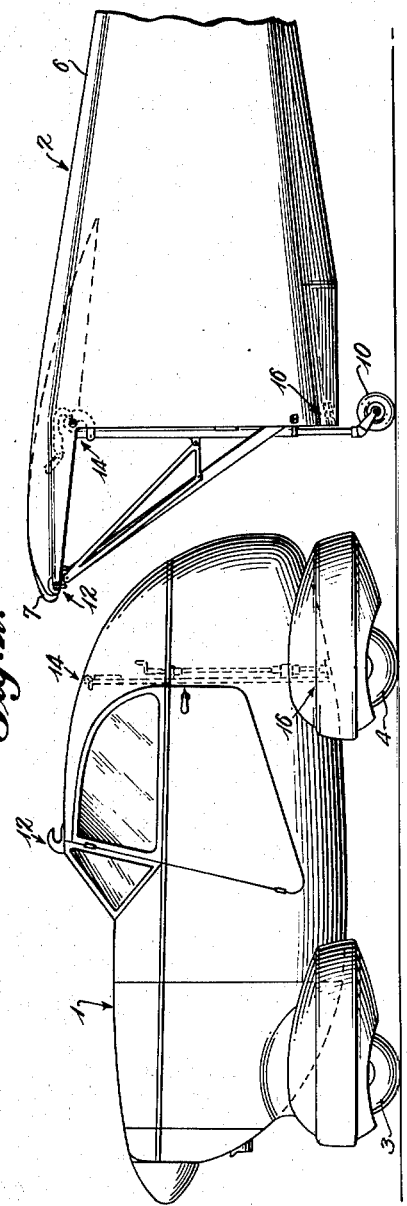
Inventor
Robert E. Fulton, Jr.
By Stevens and Davis
Attorneys

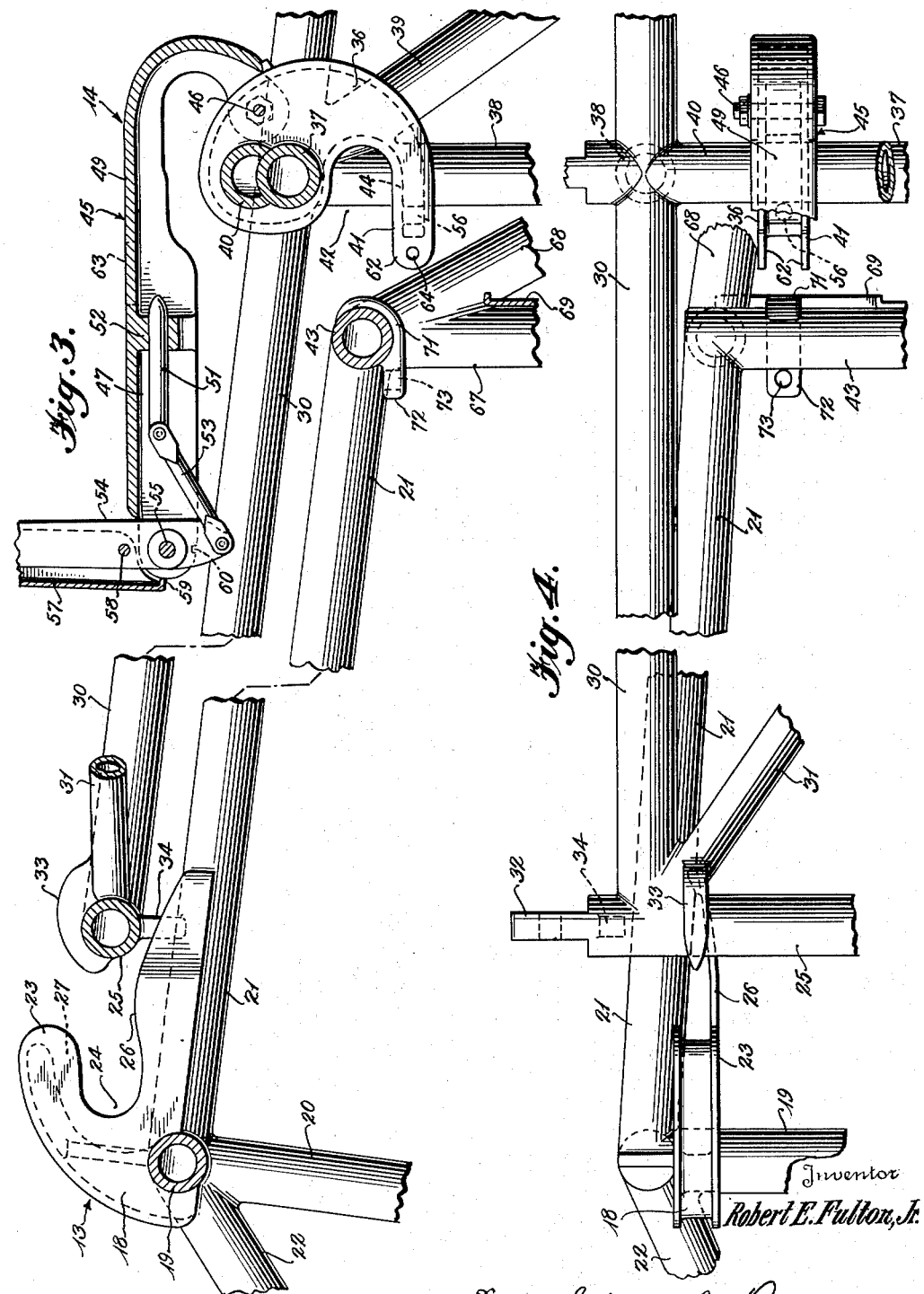

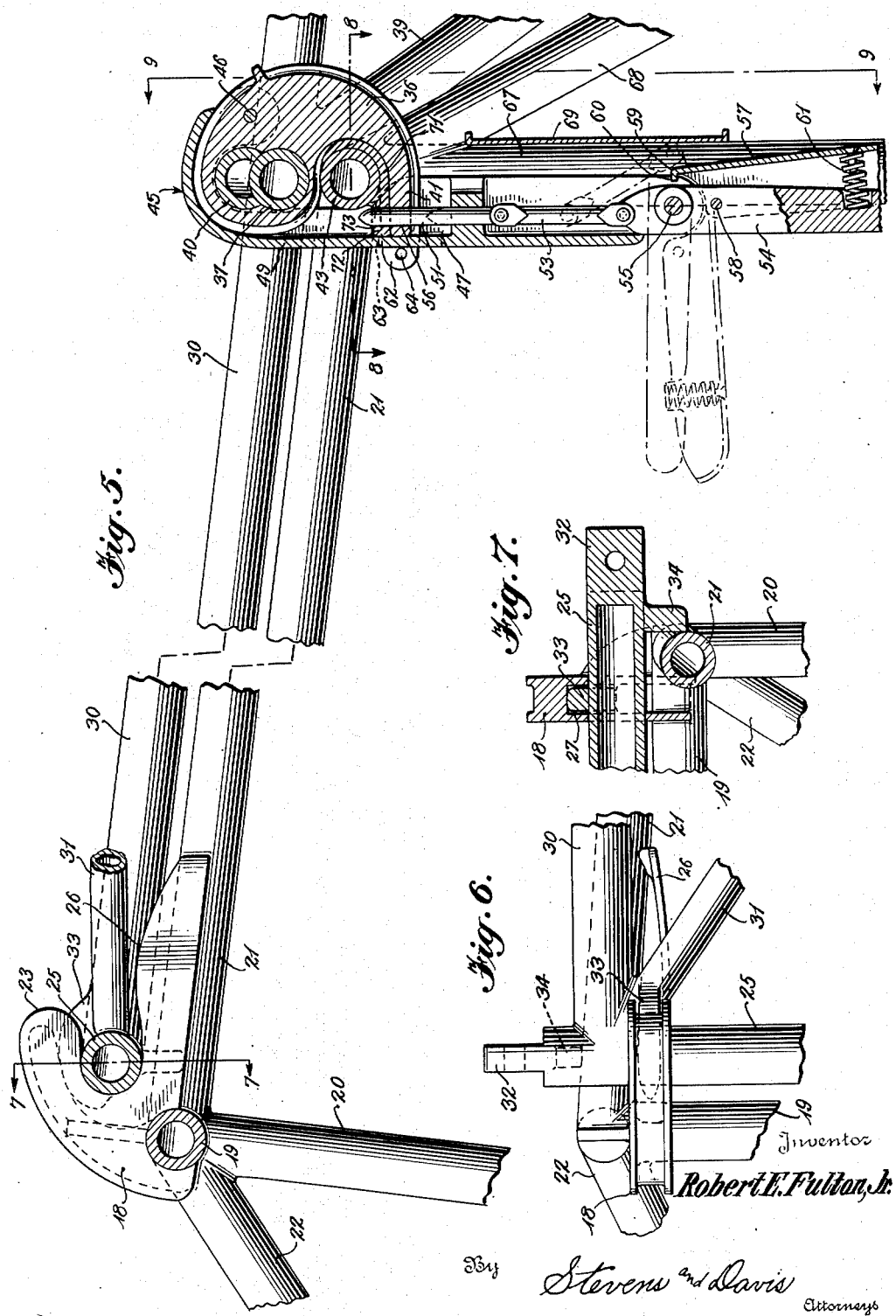

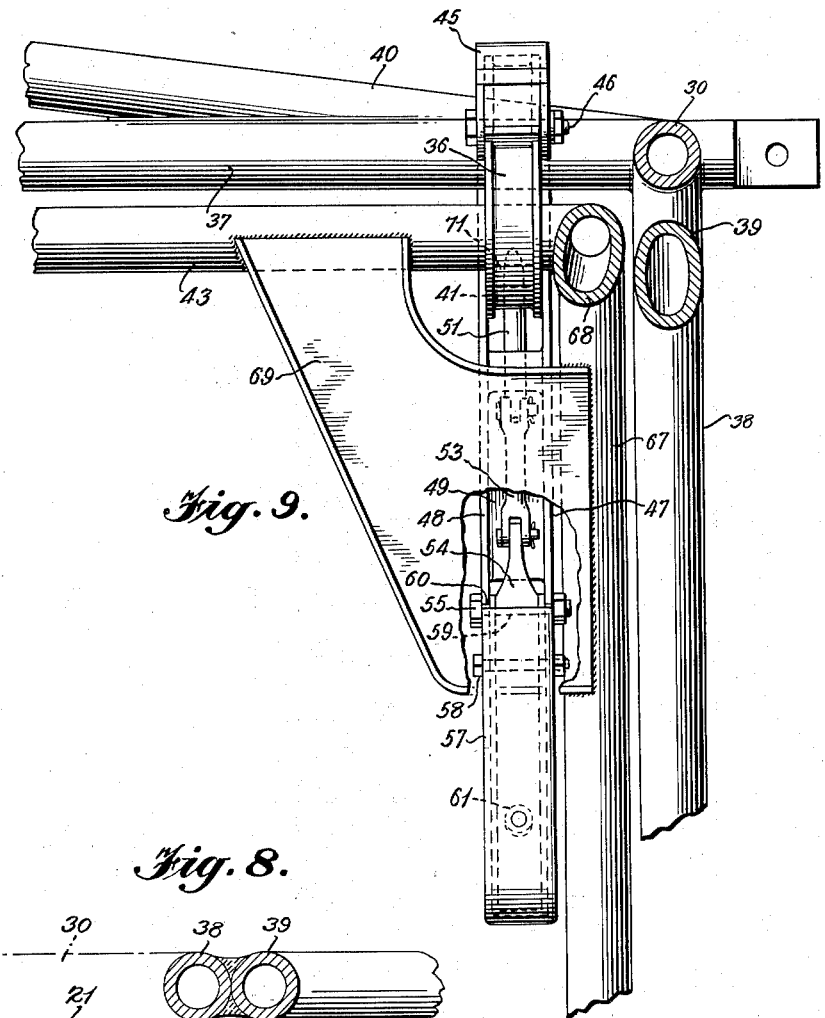

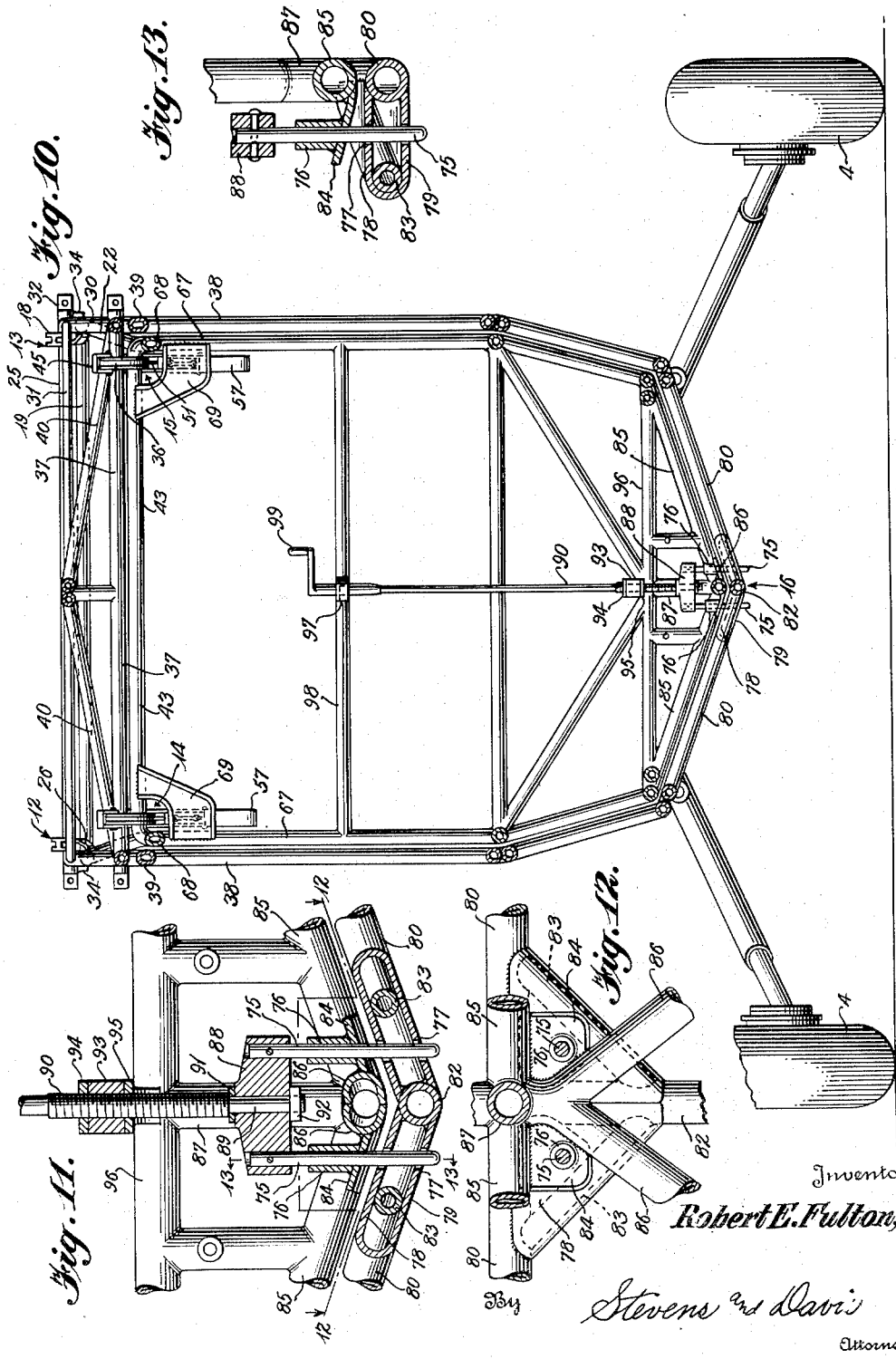

Patented Nov. 28, 1950

2,532,159

UNITED STATES PATENT OFFICE 2,532,159

ROADABLE AIRPLANE

Robert E. Fulton, Jr., Washington, D. C., assignor to Continental, Incorporated, Washington, D. C., a corporation of Connecticut Application March 3, 1945, Serial No. 580,844

6 Claims. (Cl. 244—2)

This invention relates to a vehicle primarily intended for use as an airplane in which a section containing the power unit and the operator's controls may be separately used as an automobile.

The history of the airplane is almost as old as that of the automobile. Both appeared at approximately the turn of the century. Yet today, almost a half a century later, there are a very large number of automobiles in this country to every one privately owned airplane.

Such a condition is the result of certain basic shortcomings in the airplane. Airplanes require airports to operate. Airports are of necessity located on the outskirts of communities, not infrequently at considerable distance. Thus the time saved by the speed of aerial transportation is more frequently than not consumed by the ground-travel time required to get from the airport to the flier's final destination.

Furthermore, the expense of travel between the airport and the community, usually involving taxis, is not inconsiderable. When to this is added the initial cost and upkeep of the airplane plus that of an automobile which the flier undoubtedly owns as well, it is obvious why few can afford to own an aircraft.

The average automobile ride from point of origin to destination is not over five miles. For every automobile trip of several hundred miles, the average man makes as many as a hundred short local trips. Since he can offord only an automobile or an airplane, his choice is obvious.

This has been the basic factor in retarding widespread public adoption of the airplane in the past and, unless remedied, will have a series effect on its future. Various endeavors have been made to circumvent the situation. Closer-to-town airports, locally available cars for rent, and other expedients have been offered but they fail to solve the basic practical and economic problems.

While the real cure has been much discussed, little or nothing of a practical nature has been executed to carry it into effect. Obviously there is much in common between an automobile and an airplane. Both have wheels, a body, a cab or cabin, a motor, and controls for starting, guiding and stopping. When a pilot leaves his aircraft at an airport and takes a cab to town he is leaving behind 90% of the basic elements of an automobile—an expensive and unnecessary procedure which has done more than any other thing to stifle aviation.

Others have recognized this fundamental problem and have made efforts to solve it by accomplishing a transition from airplane to car and back. But the problem has many aspects—mechanical, aerodynamic, practical, safety, economy, comfort, service and maintenance, public reaction and acceptance. Of the several suggested solutions which have been offered to date, all have failed due to neglect of one or more of the above features. Most have been so radical in conception and based on such untried principles that they have failed to hold public interest. Others have made contributions which, unless supplemented by many additional features, were of little practical value.

It is an object of this invention to produce a roadable airplane by making a practical combination of already accepted forms and styles of automobile and aircraft designs, thereby making the final unit one of greater public value by virtue of its ready acceptance resulting from its being basically a combination of already familiar elements.

An object of the present invention is to provide a roadable airplane having a removable section adapted for use as a standard automobile and an airplane section comprised of wings, fuselage and control surfaces, having cooperating interlocking means on the airplane and automobile sections by which the sections may be firmly held together to establish a complete airplane.

It is a further object of the present invention to provide cooperating interlocking means between the removable automobile section and the airplane section of an airplane, which may be rapidly and easily disconnected and equally readily and securely reconnected when the airplane is on the ground.

As a further object of the invention, the interengaging means may not be disconnected during flight as the loads which they sustain offer a material resistance against their movement to a disengaging position.

A further object of the invention is to provide cooperating interlocking means between the automobile section and the airplane section of an airplane which include guide means for facilitating the aligning of the sections as they are brought together, thereby facilitating the connection of the interlocking means.

Other features of the invention will be apparent from the following description and from the drawings, in which:

Figure 1 is a side elevation of the vehicle as it appears when the automobile and airplane sections are assembled for flight, the near side wing being removed.

Figure 2 is a side elevation showing the automobile section separated from the airplane section, and ready for road travel.

Figure 3 is a vertical longitudinal section, on an enlarged scale through the top of the automobile and airplane sections, at their interlocking portions, the sections being slightly separated and a central portion of the connecting rods being removed.

Figure 4 is a plan view of Figure 3.

Figure 5 is a view corresponding to Figure 3, but showing the airplane and automobile sections interlocked.

Figure 6 is a plan view of the left-hand portion of Figure 5.

Figure 7 is a section on the line 7—7 of Figure 5.

Figure 8 is a section on the line 8—8 of Figure 5.

Figure 9 is a section on the line 9—9 of Figure 5.

Figure 10 is a section on an enlarged scale of the framework structure on the line 10—10 of Figure 1.

Figure 11 is a vertical section through the pin interlocking means at the lower portion of Figure 10.

Figure 12 is a section on the line 12—12 of Figure 11.

Figure 13 is a section on the line 13—13 of Figure 11.

The vehicle as it appears when the automobile and airplane sections are combined for flight is shown in Figure 1. The automobile section is indicated at the forward end by the reference numeral 1, and the airplane section is indicated at the rearward end by the reference numeral 2. When the automobile section is removed from the airplane section, as is shown in Figure 2, the automobile section may be independently operated and the remaining airplane section should be self-supporting.

The automobile section 1 and the airplane section 2 must be firmly held together when the vehicle is to be used as an airplane, and the interlocking means for accomplishing this constitute the present invention. It is desirable that these interlocking means be readily disconnectable and that there be the fewest number of them consistent with a strong interconnection, so that a separation or connection between the two sections may be quickly accomplished.

The automobile section 1 includes the front wheels 3 and the rear wheels 4 and a motor to which the propeller 5 may be attached. When the automobile section is to be driven as an automobile, the propeller 5 should be made inoperative or be removed as is shown in Figure 2. Also included in this automobile section is a steering mechanism, a driving connection from the motor to one or more driving wheels and the usual control devices associated in an automobile.

The airplane section 2 includes the usual fuselage portion 6 to which are attached to the forward lifting wings 7 and the usual tail surfaces indicated generally at 8. In addition the airplane section includes linkages and cables operated by the pilot for manipulating the movable control surfaces of the airplane section. These linkages and cables must be broken or disconnected when the sections are separated but the means for accomplishing this constitutes no part of the present invention. One manner of accomplishing this is disclosed in application Serial No. 580,842 filed herewith now U. S. Patent No. 2,430,869 issued Nov. 18, 1947.

When the automobile and airplane sections are combined, the automobile section rests upon its front and rear wheels 3 and 4, and is of sufficient weight and proper balance to support the airplane section as a cantilever, as is shown in Figure 1. The wheel 9 carried beneath the tail section is retained close to the fuselage as shown in Figure 1 when the vehicle is to be used as an airplane. This wheel 9 may contact the ground during landing, but when the airplane is at rest the wheel is above the ground as shown in Figure 1.

When the automobile section 1 is removed from the airplane section 2, the airplane section must support itself and it is preferable that the means for supporting the airplane section elevate it to substantially the same position which it would occupy if it were attached to the automobile section. To support the tail section of the fuselage, the wheel 9 is moved downwardly away from the fuselage, prior to the disconnection of the airplane section from the automobile section. As it is also necessary to support the forward end of the airplane section 2, it is provided with wheels 10 which are carried beneath the two front wings 7. When the airplane section is attached to the automobile section so that the vehicle may be used as an airplane, the wheels 10 are carried in an elevated position so that they will not contact the ground. However, just before the airplane section is disconnected from the automobile section, the wheels 10 beneath each wing are lowered to the ground so that the front end of the fuselage will be supported.

The means by which the wheels 9 and 10 are supported by the airplane section and are adjustable with respect thereto forms no part of the present invention as herein described and claimed and it therefore is not illustrated here in detail. A suitable means is disclosed in application Serial No. 580,843 filed herewith.

To hold the airplane section against the automobile section, interlocking means are provided at five different points. See Figures 1, 2 and 10. These include the two bar and recess connections at 12 and 13 at the upper forward part of the cab of the automobile section, the two locking lever connections at 14 and 15 at the rearward upper part of the cab of the automobile section, and the pin connection 16 at the center of the lower rear portion of the automobile section. These five interlocking points at 12, 13, 14, 15 and 16 serve effectively to prevent movement of the airplane section relative to the automobile section not only away from the automobile section but vertically and horizontally as well.

The rod and recess sections at 12 and 13 are duplicates of each other and therefore a description of the one interlock will make it clear how the other interlock is constructed. The interlock at 13 includes a plate 18 which is connected to a cross bar 19 at its junction with the upright bar 20 and the side bars 21 and 22. These several bars constitute the upper forward left-hand corner of the cab of the automobile section. The bar 22 extends forwardly and downwardly to form the windshield frame of the cab. Bar 21 extends rearwardly over a side door of the cab of the automobile.

The plate 18 is upright and extends rearwardly from the cross bar 19 along the rearwardly extending bar 21 to which it is secured, as by welding. The upper portion of the plate 18 is provided with a rearwardly extending overhanging portion 23. This overhanging portion 23 forms a rearwardly opening recess at 24 to receive a cross bar 25 of the airplane section. Slightly rearwardly of the recess at 24 the top of the plate 18 is formed with a hump at 26 upon which the cross bar 25 rides in going into and out of the recess at 24.

The underside of the overhanging portion 23 is formed with a longitudinal extending channel 27, see Figure 7. This channel extends from the rearwardmost point of the overhanging portion 23 to the forwardmost part of the notch 24.

The cross bar 25 is at the forwardmost part of the framework of the airplane section, and is attached to a side bar 30 of the airplane framework. A diagonal brace 31 also is attached at the junction of the side bar 30 and cross bar 25. Outwardly beyond the side bar 30 the cross bar 25 is formed with an attaching means shown at 32 to receive the wing 7.

On the upper side of the cross bar 25 and adjacent to the side bar 30 is an upwardly projecting lug 33. This lug 33 is of a width to snugly fit upwardly into the channel at 27 when the cross bar 25 is within the notch 24. The forwardmost end of the lug 33 is of wedge shape as is best shown in Figure 4 to serve to guide the lug into the channel at 27.

When the cross bar 25 is deeply within the notch 24, a firm connection is established. Up and down movement of the cross bar 25 is resisted because of its location within the notch 24 and sidewise motion of bar 25 relative to the cross bar 19 is resisted by the location of the lug 33 in the channel 27.

To guide the cross bar 25 of the airplane section relative to the cross bar 19 of the automobile section as these sections are brought together and assure entry of lug 33 into the channel at 27, a depending lug 34 may be formed on the underside of the cross bar 25. This lug 34 is so positioned that it will bear against and ride along the outer side of the side bar 21 of the cab of the automobile section. As the bar 21 slopes inwardly toward the rear as appears from Figure 4, the lug 34 and the corresponding lug at the other side of the cab will be guided during their forward movement so that the lug 33 and the corresponding lug at the other side of the cab will enter into their respective channels at 27.

To lock the airplane section onto the automobile section at their upper portions, the locking lever means shown at 14 and 15 is provided. Since they are similar a discussion of the one at 15 will be sufficient. This includes a plate 36 which is attached to a cross bar 37 of the airplane section. The cross bar 37 is attached to the side bar 30 and to this same junction point is attached an upright bar 38 and a diagonal bar 39. Also attached to this common junction point is an inclined cross bar 40 which is vertically above the cross bar 37 and tapers downwardly to a flush surface at the top of the side bar 30. This cross bar 40 and the corresponding cross bar 40 on the other side of the airplane form an arched construction with the horizontal cross bar 37, as shown in Figure 10.

The lower portion of the plate 36 is formed with a forwardly projecting extension 41 and this projection 41 forms within the plate 36 a notch 42 to receive a cross bar 43 of the automobile section. The upper face of the extension 41 is channeled at 44 and this channel extends rearwardly around to the rear side of the notch 42.

Pivoted to the plate 36 is a locking lever 45.

This lever 45 is pivoted to the plate 36 by a pin 46 which is located on the rearward side of plate 36 from the notch 42. The lever 45 is curved at its top portion so that it will pass over the cross bar 40 and will lie downwardly on the opposite sides of the cross bars 37 and 40 from the pivot point at 46. The lever 45 serves to retain the cross bar 43 of the automobile section within the notch 42 and for this purpose bears firmly against the cross bar 43 when the lever 45 is in a downward position.

The locking lever 45 is of U-shape construction in cross section and includes the side plates 47 and 48 and the connecting front plate 49, see Figure 8. The side plates 47 and 48 are spaced sufficiently apart closely to lie against the sides of the plate 36 and the front connecting plate 49 is curved at its upper portion to lie against the top side of the plate 36. This close-fitting relationship between the lever 45 and the plate 36 provides a rigid construction.

To lock the lever in the position shown in Figure 5, in which it retains the bar 43 in the notch 42, the lever 45 is provided with a locking pin 51. The pin 51 passes through and is guided within a transverse block 52 between side plates 47 and 48 of the lever 45. The pin 51 is pivoted at its lower end to a connecting rod 53 which is also pivoted to a handle 54. The handle 54 lies between downwardly projecting portions of the side plates 47 and 48 and is pivoted to them by a pivot pin 55.

Rotational movement of the handle 54 about the pin 55 will cause reciprocating motion of the locking pin 51. The pin 51 may in this manner be urged upwardly through an opening 56 in the forwardly projecting portion 41 of the plate 36. To lock the handle 54 in its position which causes the pin 51 to lie within the opening 56, the handle is provided with a catch member 57 pivoted to the handle at 58. The catch member 57 is formed with a projecting lip 59 which bears against the lower ends of the plates 47 and 48 of the lever 45 and may enter a notch 60 formed in these plates 47 and 48. To urge the catch member into locking position, a spring 61 is located between the catch member 57 and the handle 54.

In locking position, the lever 45 extends substantially vertically downwardly and the handle 54 extends in line away from the lever as shown in Figure 5 in full lines. In this position the catch 57 is locked in position by the lip 59 entering the slot 60. To separate the automobile and airplane sections, the handle 54 is turned to the right angular position to retract the pin 51 from the opening 56 as shown in dotted lines in Figure 5. Then the lever 45 may be swung upwardly to a substantially horizontal position as shown in Figure 3. In this upper position it may be desirable to restore the handle 54 to a position in line with the lever 45 so that it will not project upwardly into the fuselage.

When the lever 45 is in its locked position of Figure 5 and the pin 51 is in the opening 56, the pin is placed in shear by the tendency of the automobile and airplane sections to separate. When it is desired to move the lever 45 to its unlocked position of Figure 3, the lever 45 may first be drawn toward the locking position to relieve the pin 51 of this shear and then the handle 54 may be turned to retract the pin 51 from the opening 56. Unless this is done it may be impossible to withdraw pin 51 and this is an important safety feature making it impossible to unlock the lever while in flight.

To prevent an unauthorized person from unfastening the lever 45 when it is serving to lock the automobile and airplane sections together, the plate 36 may be provided with one or more lugs 62 which project beyond the extension 41. These lugs 62 pass through openings 63 (Figs. 3 and 5) through the front member 46 of the locking lever 45 and a lock may be passed through openings 64 in the extensions 62. Even though the locking pin 51 is retracted by the handle 54, it will then be impossible to move the lever 45 from its locking position of Figure 5.

The cross bar 43 (Fig. 4) is attached to the side bar 21 of the cab of the automobile section at the junction of the side bar 21 with a vertical bar 67 and an inclined bar 68. A gusset plate 69 (Figs. 4 and 9) connects the cross bar 43 and the upright bar 67 at their meeting corner.

Attached to the cross bar 43 at a point in line with the channel 44 of the plate 36 is a lug 71. This lug 71 extends from the rearward side of the cross bar 43 around the underside of the cross bar and forwardly to a projecting portion 72. An aperture 73 through this projecting portion 72 is in line to receive the locking pin 51 to further lock the sections together.

The interlock at 16 shown in Figures 10 to 13, serves to retain the automobile section and airplane section together at their lower meeting portions. This interlock includes a pair of vertical pins 75 which are mounted in vertical guides 76 carried by the automobile section and which penetrate through openings 77 in the airplane section.

The openings 77 are in an upper plate 78 and a lower plate 79 which are welded to a pair of bottom rail bars 80 of the airplane section. These bottom rails 80 incline upwardly from a centrally located longitudinal bar 82 which extends rearwardly. Side braces 83 connect the central longitudinal bar 82 with the bottom rails 80, and the plates 78 and 79 are welded to the braces 83.

The guides 76 are secured to plates 84 which are attached to bottom rails 85 of the automobile section. The bars 85 are inclined at the same angles as the bars 80 of the airplane, which they directly overlie. A pair of braces 86 are attached to the bars 85 at their central meeting point, and an upright 87 extends vertically upwardly from this common meeting point. The plates 84 are also attached to these bars 86 to give them rigidity.

Pins 75 are carried by a cross head 88. Extending through the center of the cross head 88 and rotatable therein is the reduced cylindrical end portion 89 of a threaded shaft 90. A washer 91 above the cross head and a washer 92 attached to the cylindrical extension 89 below the cross head serves to prevent endwise movement of the cross head relative to the screw shaft 90. The shaft 90 may therefore turn within the cross head 88 and up and down movement of the screw shaft 90 carries with it the cross head 88 to thereby withdraw the pins 75 from or urge them downwardly into the openings 77.

The screw threads on the shaft 90 are within a nut 93. The nut 93 is mounted between plates 94, 95 which are attached to a cross bar 96 of the framework of the automobile section. These plates 94 and 95 prevent up and down movement of the nut 93 and also prevent its rotation so that rotation of the screw shaft 90 will cause it to screw up and down through the nut 93.

The upper end of the screw shaft 90 is rotatable in a bearing 97 attached to a cross bar 98 of the automobile framework. The screw shaft 90 can move up and down through the bearing during its rotation. A handle 99 attached to the screw shaft makes it possible to readily rotate the shaft.

When the automobile section is to be removed from the airplane section so that the automobile may be driven as a unit, the wheels 10 beneath the wings and the wheel 9 beneath the tail sections are first lowered to the point where they take the strain off the interconnecting means 12, 13, 14, 15 and 16. Thereafter, the handle 99 is rotated to withdraw the locking pins 75 from their engagement within the openings 77 of the airplane section. The locking levers 45 are then released by means of the handles 54. It should be observed that the handle 99 and levers 45 are accessible from the interior of the cab. Thereafter, the automobile section may be driven away from the airplane section or the airplane section may be withdrawn rearwardly from the automobile section. The airplane section will then be left in its self-supporting position as shown to the right of Figure 2.

When the automobile and airplane sections are to be reunited, they are brought together and the interlocking portions are lined up with each other without requiring undue care because of the guiding means which have been described. These include the lugs 33 which enter the channels at 27 at the forwardmost upper part of the cab and the lugs 71 which enter the channels at 44 at the upper rearward portion of the cab of the automobile section. Also the downwardly convergent formation of the bars 80 and 85 of the airplane and automobile sections as shown in Figure 11 serves to align the lower meeting portions so that pins 75 may be urged downwardly through the openings 77.

After the locking levers 45 have been moved to their downward locking position and the pins 75 have been moved downwardly into the airplane section, a rigid connection is established. This is not only because the interlocking means are within themselves of considerable strength, but because as will appear from the side elevation shown in Figure 1, the connections 12, 14 and 16 constitute a triangular relationship which effectively prevents separation. Likewise, in their rear elevation as is shown in Figure 10, the interconnections 14, 15 and 16 constitute a rigid triangle. In plan view, the interconnections 12, 13 and 16 constitute another rigid triangle which serves effectively to retain the sections together. Furthermore, the four interconnections 12, 13, 14 and 15 are on opposite sides of the body and are at forward and rearward portions of the wings so that the lifting forces of the wings are applied directly to the upper part of the cab thereby to carry the automobile section.

Flight conditions, which these interlocking mechanisms are designed to cope with, impose three principal loads upon the interconnecting units. "Thrust" of the propeller pulls the automobile unit forward while "drag" of the wings and fuselage tend to hold the airplane back. The wings lift the airplane and automobile upward while gravity pulls both downward, principally tending to separate the automobile from the plane section. In uncoordinated turns and turbulent air, forces are set up tending to separate the automobile from airplane section in a lateral direction.

The opposing forces of thrust and drag are withstood by the arrangement of the two large lock levers at 14 and 15 (Figure 1) and by the mechanism at 16 (Fig. 2).

Lift and gravity are withstood by the arrangement of the elements at 12 and 13 and at 14 and 15 and at 16 (Fig. 2).

Lateral separating tendencies are withstood by the channel design of the elements at 12, 13, 14 and 15 and by the pins at 16 (Fig. 2). The design and arrangement of the channel units is also such that the otherwise difficult task of aligning the automobile with the airplane section when the two are being connected is greatly simplified by the telescoping effect of these elements.

Further, the otherwise extremely difficult problem of inserting the locking pins 51 (Fig. 5) at 14 and 15 is completely eliminated by virtue of the levers being so designed that they provide a vise-grip effect as they slip into place and thereby automatically pull the automobile and airplane units into such alignment that the locking pins 51 slip smoothly into the aligned holes. A major problem would exist if it were necessary manually to hold the holes in alignment while the pins were being inserted. Due to the relatively long length of the lever 45 and its handle 54, and the closeness of notch 42 to the fulcrum 46, an enormous force may be exerted on cross bar 43 to pull it into notch 42.

During flight, it is practically impossible to move the interconnecting means to their disconnecting positions, as the stresses imposed on these parts in sustaining the automobile section and carrying the airplane section forward, offer a strong frictional resistance against their movement. Thus, the pins 51 are placed in shear during flight and consequently a considerable force would have to be exerted to withdraw them. Likewise, the pins 75 are in shear and to withdraw them from locking position would be nearly impossible.

What is claimed is:

1. In a roadable airplane including an airplane section and a separable automobile section, the airplane section including a fuselage and tail assembly and supporting wings and the automobile section including a power source, passenger compartment, controls and wheels for land travel, the improvement that comprises means for attaching the automobile section to the airplane section at at least three points, said attaching means including at least one horizontally disposed socket-shaped member on one of said sections and a complementary shaped member on the other of said sections so constructed and arranged to cooperate therewith to guide said sections into position and to position said sections laterally with respect to each other, said socket-shaped member including a recess with vertically disposed portions to receive a complementary shaped member on the other of said sections so constructed and arranged to cooperate to guide said sections into position and to position said sections vertically with respect to each other and clamping means on one of said sections so constructed and arranged to draw said sections together and force said complementary shaped members into cooperating relation with said socket-shaped positioning members.

2. In a roadable airplane including an airplane section and a separable automobile section, the airplane section including a fuselage and tail assembly and supporting wings and the automobile section including a power source, passenger compartment, controls and wheels for land travel, the improvement that comprises means for attaching the automobile section to the airplane section at at least three points, said attaching means including at least one horizontally disposed socket-shaped member on one of said sections and a complementary shaped member on the other of said sections so constructed and arranged to cooperate therewith to guide said sections into position and to position said sections laterally with respect to each other, said socket-shaped member including a recess with vertically disposed portions to receive a complementary shaped member on the other of said sections so constructed and arranged to cooperate to guide said sections into position and to position said sections vertically with respect to each other, clamping means on one of said sections so constructed and arranged to draw said sections together and force said complementary shaped members into cooperating relation with socket-shaped positioning members and locking means for locking said clamping means in position.

3. In a roadable airplane including an airplane section and a separable automobile section, the airplane section including a fuselage and tail assembly and supporting wings and the automobile section including a power source, passenger compartment, controls and wheels for land travel, the improvement that comprises means for attaching the automobile section to the airplane section at at least three points, said attaching means including at least one horizontally disposed socket-shaped member on one of said sections and a complementary shaped member on the other of said sections so constructed and arranged to cooperate therewith to guide said sections into position and to position said sections laterally with respect to each other, said socket-shaped member including a recess with vertically disposed portions to receive a complementary shaped member on the other of said sections so constructed and arranged to cooperate to guide said sections into position and to position said sections vertically with respect to each other, at least two clamps on one of said sections so constructed and arranged to draw said sections together and force said complementary shaped members into cooperating relation with socket-shaped positioning members.

4. In a roadable airplane including an airplane section and a separable automobile section, the airplane section including a fuselage and tail assembly and monoplane supporting wings and the automobile section including a power source, passenger compartment, controls and wheels for land travel, the improvement that comprises means for attaching the automobile section to the airplane section at the front spar of the supporting wings, at the rear spar of the supporting wings and at a lower point on the fuselage and automobile section, the means for connecting the sections at the front spar including longitudinally extending U-shaped members attached to one section and complementary shaped members attached to the other section so as to be engaged by the movement of the airplane section forwardly with relation to the automobile section, and lateral positioning members on the fuselage section and the automobile section, so shaped as to engage as the sections are brought together even though they are somewhat out of lateral alignment, and to force the sections into lateral alignment as the sections are brought tightly together, the attaching means at the rear spar also including U-shaped connecting members on one of said sections and complementary shaped parts on the other section and further including at least one pivotable clamping member positioned to force the complementary shaped part into the second-mentioned U-shaped supporting member and hold it in that position, pin held locking means for said pivoted clamping member and a pin for holding said sections together at a lower point on said sections.

5. In a roadable airplane as defined in claim 4 the further improvement that comprises providing at least two clamping members and pin locking means therefor.

6. In a roadable airplane as defined in claim 4 the further improvement that comprises pivoting said clamping member at a point above the bottom of the U of the second-mentioned U-shaped member so as to reduce its tendency to pivot and release the complementary shaped member which it clamps in the U-shaped member.

ROBERT E. FULTON, Jr.

REFERENCES CITED

The following references are of record in the file of this patent:

UNITED STATES PATENTS

| Number | Name | Date |
|---|---|---|
| 1,294,415 | Curtiss et al. | Feb. 18, 1919 |
| 2,215,003 | Johnson | Sept. 17, 1940 |
| 2,241,577 | Beals, Jr. | May 13, 1941 |